United States Patent
Schedivy

(10) Patent No.: US 7,857,176 B2
(45) Date of Patent: Dec. 28, 2010

(54) SEAT MOUNTABLE VIDEO SYSTEM

(75) Inventor: George C. Schedivy, Aquebogue, NY (US)

(73) Assignee: Audiovox Corporation, Hauppauge, NY (US)

( * ) Notice: Subject to any disclaimer, the term of this patent is extended or adjusted under 35 U.S.C. 154(b) by 754 days.

(21) Appl. No.: 10/705,291

(22) Filed: Nov. 10, 2003

(65) Prior Publication Data

US 2005/0098593 A1    May 12, 2005

(51) Int. Cl.
 B60R 7/04        (2006.01)
(52) U.S. Cl. .................. 224/275; 224/282; 224/553; 224/929; 297/188.06
(58) Field of Classification Search ............... 224/275, 224/282, 548, 551, 553, 929; 348/376, 837; 725/75, 77; 248/919; 297/188.06
See application file for complete search history.

(56) References Cited

U.S. PATENT DOCUMENTS

| | | | |
|---|---|---|---|
| 2,853,219 A | 9/1958 | Schwartz | |
| 3,014,759 A | 12/1961 | Bing | |
| 3,975,862 A | 8/1976 | Doan | 49/409 |
| 4,306,377 A | 12/1981 | Sterling et al. | 49/250 |
| D275,818 S | 10/1984 | Leiserson | 3/33 |
| D275,819 S | 10/1984 | Leiserson | 3/33 |
| 4,585,273 A | 4/1986 | Higgs et al. | 297/452 |
| 4,658,298 A | 4/1987 | Takeda et al. | 358/254 |
| 4,681,366 A * | 7/1987 | Lobanoff | 297/188.06 |
| 4,792,183 A * | 12/1988 | Townsend, III | 297/163 |
| 4,836,485 A * | 6/1989 | Cooper | 248/278.1 |
| 4,887,394 A | 12/1989 | Marlowe | 49/409 |
| 5,044,321 A | 9/1991 | Selph | 119/96 |
| 5,123,706 A | 6/1992 | Granzow et al. | 297/452 |
| 5,246,240 A * | 9/1993 | Romich et al. | 280/304.1 |
| 5,253,924 A | 10/1993 | Glance | 297/452.1 |
| 5,326,175 A | 7/1994 | Carter | 383/22 |
| 5,337,985 A * | 8/1994 | Hale | 248/174 |
| 5,555,466 A | 9/1996 | Scribner et al. | 348/8 |
| 5,729,291 A * | 3/1998 | Tanaka et al. | 348/373 |
| 5,868,294 A | 2/1999 | Webster | 224/275 |
| 5,878,672 A | 3/1999 | Ostermann et al. | 108/44 |
| 5,984,347 A | 11/1999 | Blanc-Rosset | 280/727 |
| 5,988,757 A | 11/1999 | Vishey et al. | 297/452.31 |
| 6,010,195 A | 1/2000 | Masters et al. | 297/452.55 |
| 6,092,705 A | 7/2000 | Meritt | 224/275 |
| 6,097,448 A | 8/2000 | Perkins | 348/837 |
| 6,105,839 A * | 8/2000 | Bell | 224/275 |
| 6,185,784 B1 | 2/2001 | Gamperle | 16/99 |
| 6,199,252 B1 | 3/2001 | Masters et al. | 29/91.1 |
| 6,216,927 B1 | 4/2001 | Meritt | 224/275 |
| 6,260,750 B1 * | 7/2001 | Chiang | 224/275 |

(Continued)

FOREIGN PATENT DOCUMENTS

DE    19943696 A1 *    3/2001

(Continued)

Primary Examiner—Justin M Larson
(74) Attorney, Agent, or Firm—F. Chau & Associates, LLC

(57) ABSTRACT

A video system includes a display, and a media source operatively coupled to the display, wherein the display and the media source are mounted to a vehicle seat, and at least the display is capable of being fixed to different positions using a mounting mechanism. The mounting mechanism may include at least one of a bracket, a post and a wedge.

12 Claims, 20 Drawing Sheets

U.S. PATENT DOCUMENTS

| | | | |
|---|---|---|---|
| 6,283,299 B1 | 9/2001 | Lee | 206/760 |
| 6,315,180 B1 * | 11/2001 | Watkins | 224/275 |
| 6,371,345 B1 * | 4/2002 | Leyden et al. | 224/553 |
| 6,380,978 B1 * | 4/2002 | Adams et al. | 348/452 |
| 6,393,745 B1 | 5/2002 | Miki | 40/586 |
| 6,439,443 B1 * | 8/2002 | Liao | 224/275 |
| 6,473,315 B2 | 10/2002 | Denmeade | 361/831 |
| 6,522,368 B1 | 2/2003 | Tuccinardi et al. | 348/837 |
| 6,585,201 B1 * | 7/2003 | Reed | 248/181.1 |
| 6,619,605 B2 * | 9/2003 | Lambert | 248/226.11 |
| 6,994,236 B2 * | 2/2006 | Hsu | 224/275 |
| 2001/0008266 A1 | 7/2001 | Lambert et al. | |
| 2001/0011664 A1 | 8/2001 | Meritt et al. | |
| 2003/0025367 A1 | 2/2003 | Boudinot et al. | |
| 2003/0057339 A1 | 3/2003 | Watkins et al. | |
| 2003/0102235 A1 | 6/2003 | Swaim et al. | |
| 2003/0121943 A1 * | 7/2003 | Chou | 224/275 |
| 2003/0150892 A1 | 8/2003 | Hoe et al. | |
| 2003/0184137 A1 | 10/2003 | Jost et al. | |
| 2003/0226148 A1 * | 12/2003 | Ferguson | 725/75 |
| 2005/0196152 A1 * | 9/2005 | Chen et al. | 386/125 |

FOREIGN PATENT DOCUMENTS

JP 06197245 A * 7/1994

* cited by examiner

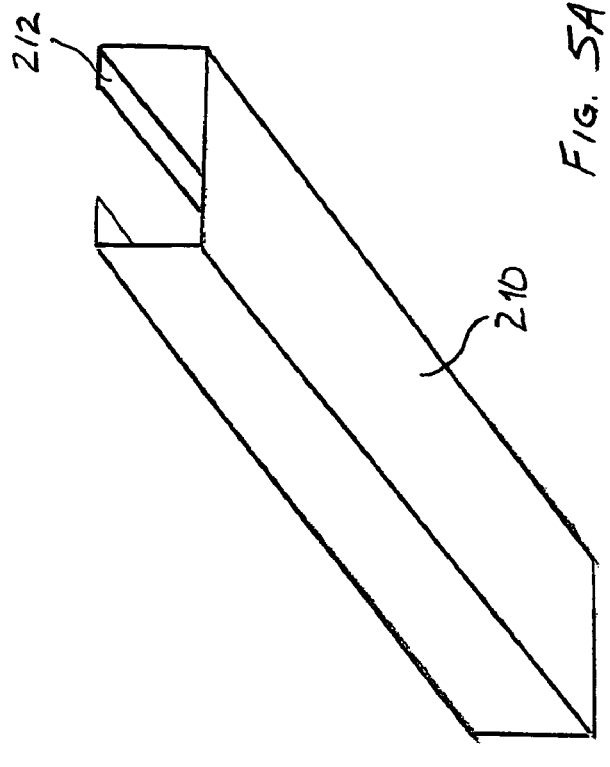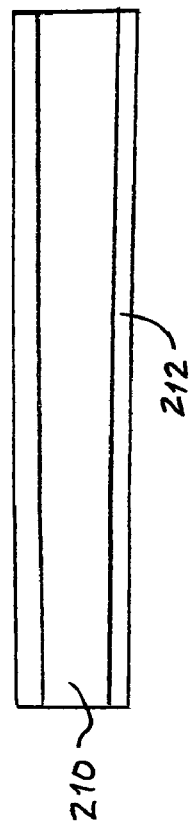

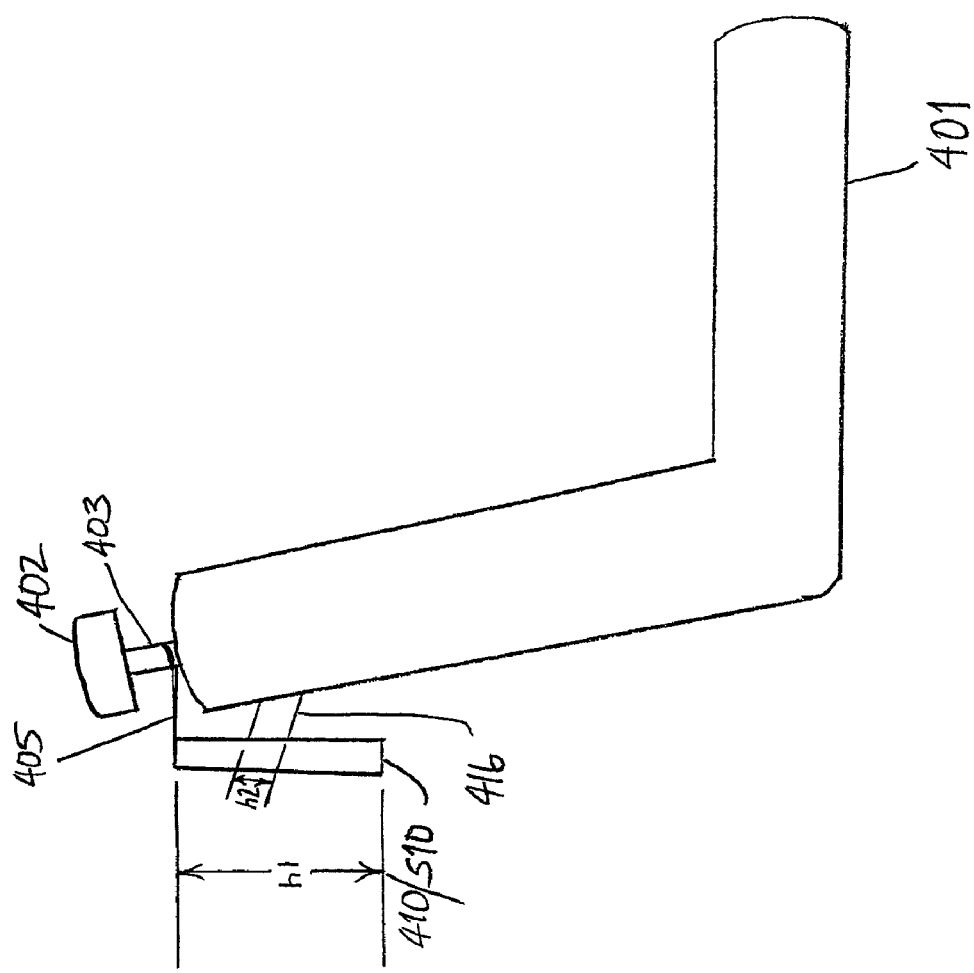

SEAT MOUNTABLE VIDEO SYSTEM

BACKGROUND OF THE INVENTION

1. Technical Field

The present disclosure relates to a video system, and more particularly, to a video system capable of being mounted to a vehicle seat.

2. Discussion of Related Art

As society becomes more mobile and therefore spends a greater amount of time traveling and away from home, demand rises for electronic appliances and devices outside the home environment. For example, as shown in FIGS. 1 and 2, video screens 101 have been mounted in the headrests 102 of vehicles, facilitating video entertainment on the road. These video screens are connected to video players located away from the video screen, for example, in the glove box of the vehicle. The video player and video screen of these systems are not mounted together on the seat. As a result, more free space than necessary is occupied in the vehicle and connections between the video player and video screen can be cumbersome.

Further, the video player and video screen are not removable from the vehicle for use outside of the vehicle or in another vehicle. Thus, videos may only be viewed with such systems when occupying a specific vehicle. Also, there is no way to hide the video screen from view when not in use, so as to reduce the risk of theft of an entertainment system when the vehicle is left unattended.

Therefore, a need exists for a video system that is capable of being mounted in its entirety to a vehicle seat, and which is removable from a vehicle and/or can be hidden from view when not in use.

SUMMARY OF THE INVENTION

A video system, in accordance with an embodiment of the present invention, includes a display, and a media source operatively coupled to the display, wherein the display and the media source are mounted to an assembly capable of selective insertion into and removal from an interior section of a seat of a vehicle.

The interior section may include at least one track for allowing the assembly to slide into and out of the interior section, wherein the at least one track is mounted to an internal support structure of the seat. The assembly may include at least one rail, at least one wheel, or a combination of the at least one rail and the at least one wheel, wherein the at least one rail and the at least one wheel fit into a groove on the at least one track for allowing the assembly to slide on the at least one track. The assembly may include a housing. The display and the media source may be attached to the housing via a mounting bracket. The mounting bracket may include at least one knob holding the display in place. A tilt angle of the display about the z-axis may be changed by loosening the at least one knob to release the display for rotation to a desired tilt angle and tightening the at least one knob to secure the display at the desired tilt angle. The mounting bracket may include a plurality of moveable arms capable of being fixed in a plurality of positions along at least one of the x-axis, y-axis and the z-axis for changing positions of the display.

The housing may be permanently anchored to the assembly or capable of selective coupling to and decoupling from the assembly. The media source and/or the display may be permanently attached to the housing or capable of selective coupling to and decoupling from the housing.

The assembly may include a power inverter mounted thereto and the power inverter may be connected to a power supply of the vehicle via a power cable running through the interior section of the seat. The assembly may also include at least one of an audio/video port, a headphone port, a power port, an infrared port and a wireless transmitter for transmitting wireless signals positioned thereon. A first end of the assembly may remain attached to the seat when the assembly is removed from the interior section and a second end of the assembly can attach to a further seat when the assembly is removed from the interior section so that the assembly, including the display and the media source mounted thereto, can be supported between the seat and the further seat. The assembly may attach to the further seat via a locking mechanism including at least one of a snap-fit mechanism, a magnetic fastener and a hinged cover.

The media source may be one of a slot-type device, a clamshell-type device and a drawer-type device and may include at least one of a DVD player, a CD player, a video game player, a videocassette player, a television tuner, a radio tuner, and a device capable of playing at least one of computerized video files and computerized audio files.

Another video system, in accordance with an embodiment of the present invention, includes a display, and a media source operatively coupled to the display, wherein the display and the media source are supported by a housing attached to at least one rigid member coupled to at least one headrest support member of a seat in a vehicle.

The at least one rigid member may be coupled to the at least one headrest support member using a bracket, wherein the bracket includes a ring and a locking mechanism. The at least one rigid member may be attached to the housing via a moveable joint and may be capable of being fixed in a plurality of positions along at least one of the x-axis, the y-axis and the z-axis. The at least one rigid member can be fixed using a locking nut.

The video system further includes a wedge positioned between the seat and the housing, wherein one end of the wedge is mounted to the housing and another end of the wedge is butted against the seat. The wedge may be capable of being fixed in a plurality of positions along the y-axis for changing a tilt angle of the display about the z-axis.

The housing may be formed from one of an unbendable material and a bendable material and may include at least one opening for providing access to the media source and/or at least one opening for allowing a view of the display. The display and/or the media player may be permanently anchored to the housing or capable of being selectively positioned in and removed from the housing.

The video system may further include at least one of an audio/video port, a headphone port, a power port, an infrared port and a wireless transmitter for transmitting wireless signals positioned on at least one of the display, the media source and the housing. The media source may be one of a slot-type device, a clamshell-type device and a drawer-type device and may include at least one of a DVD player, a CD player, a video game player, a videocassette player, a television tuner, a radio tuner, and a device capable of playing at least one of computerized video files and computerized audio files.

Another video system, in accordance with an embodiment of the present invention, includes a display, and a media source operatively coupled to the display, wherein the display and the media source are mounted to a vehicle seat, and at least the display is capable of being fixed to different positions using a mounting mechanism.

The different positions may include at least one of a plurality of points along the x-axis, a plurality of points along the y-axis, a plurality of points along the z-axis, and a plurality of tilt angles about the z-axis.

The video system may further include an intermediate structure attached to the vehicle seat between the vehicle seat and the mounting mechanism, and the mounting mechanism may include a mounting bracket attached to the intermediate structure and to the display. The mounting bracket may include at least one knob holding the display in place. A tilt angle of the display about the z-axis may be changed by loosening the at least one knob to release the display for rotation to a desired tilt angle and tightening the at least one knob to secure the display at the desired tilt angle. The mounting bracket may include a plurality of moveable arms capable of being fixed in a plurality of positions along at least one of the x-axis, y-axis and the z-axis for changing positions of the display.

The mounting mechanism may include at least one mounting post positioned between the vehicle seat and the display. One end of the at least one mounting post may be attached to a housing for supporting the display via a moveable joint and another end of the at least one mounting post may be attached to a headrest post of the vehicle seat. The at least one mounting post may be capable of being fixed with a locking nut in a plurality of positions along at least one of the x-axis, the y-axis and the z-axis.

The mounting mechanism may be a wedge positioned between the vehicle seat and the display, wherein one end of the wedge is mounted to a housing for supporting the display and another end of the wedge is butted against the vehicle seat. The wedge may be capable of being fixed in a plurality of positions along the y-axis for changing a tilt angle of the display about the z-axis.

BRIEF DESCRIPTION OF THE DRAWINGS

Preferred embodiments of the present invention will be described below in more detail, with reference to the accompanying drawings:

FIGS. 5A and 5B are illustrations of tracks used with a video system according to an embodiment of the present invention;

FIGS. 11A-11C are illustrations of a video system according to an embodiment of the present invention.

DETAILED DESCRIPTION OF THE PREFERRED EMBODIMENTS

According to embodiments of the present invention, a portable video system can be mounted to a vehicle seat. The portable video system is capable of receiving a data media, such as a digital video disk (DVD), comprising data to be displayed. The video system may be removable from the vehicle and/or may be hidden from view when not in use.

Figure 1:
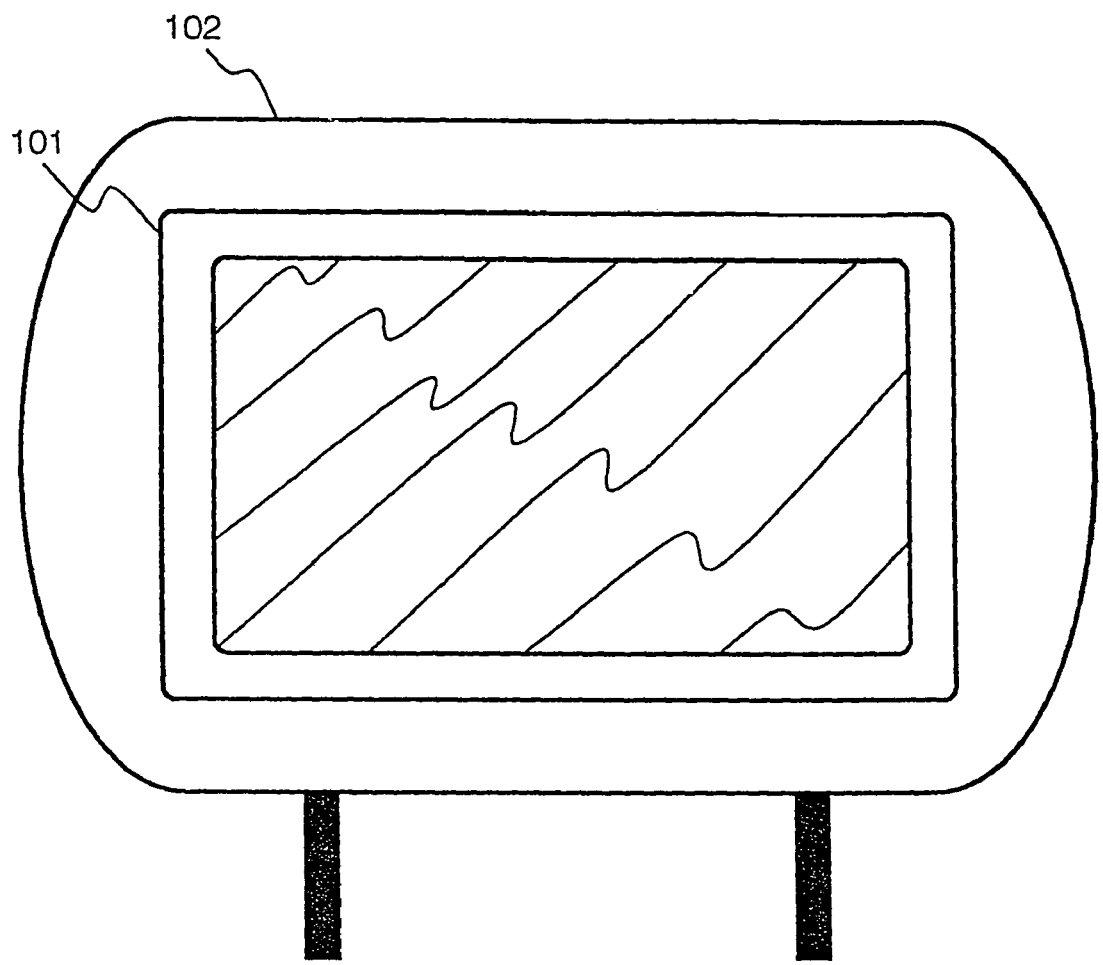
FIG. 1 is an illustration of a video screen installed in a vehicle headrest.
Figure 2:
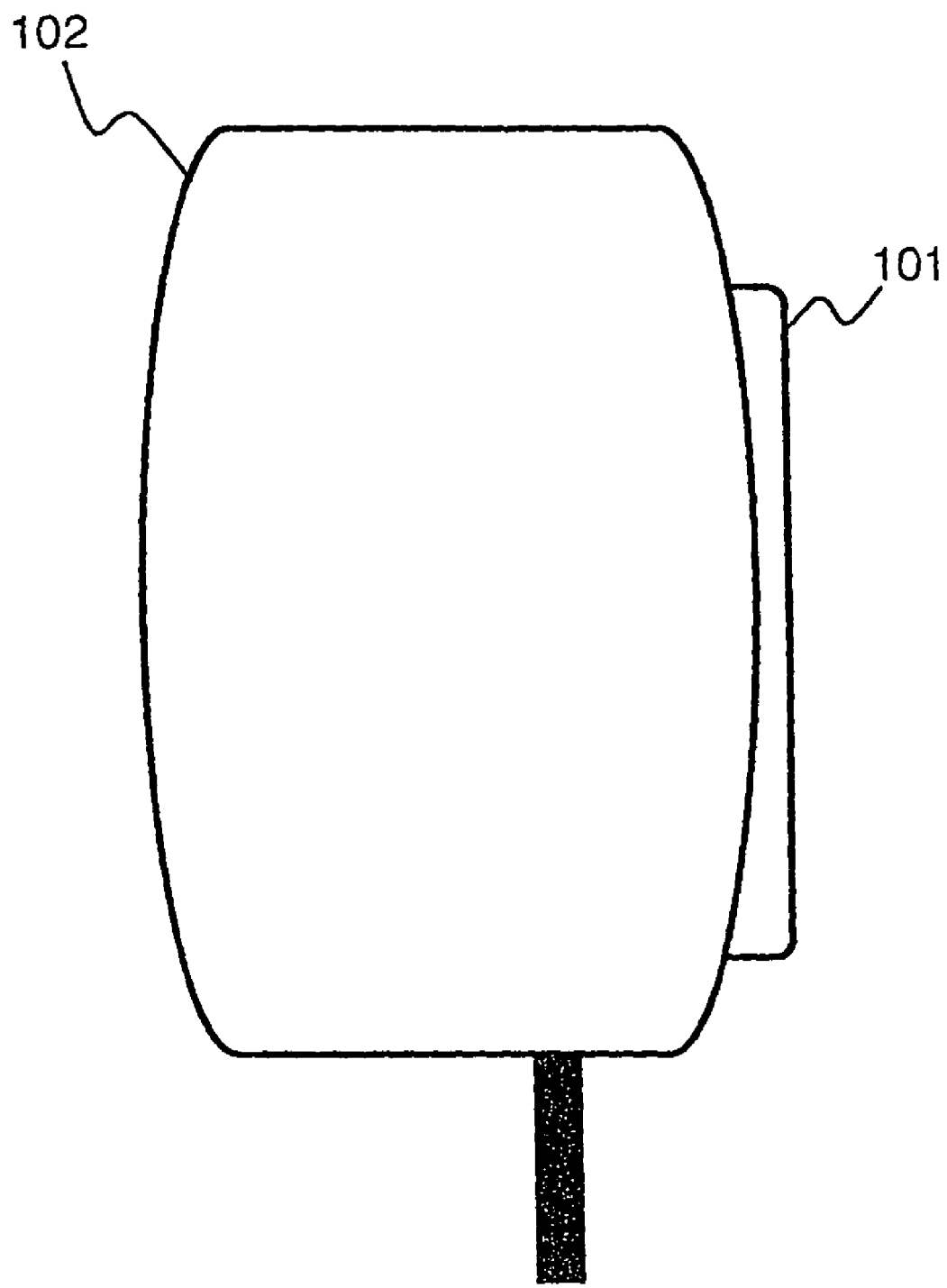
FIG. 2 is an illustration of a video screen installed in a vehicle headrest.
Figure 3A:
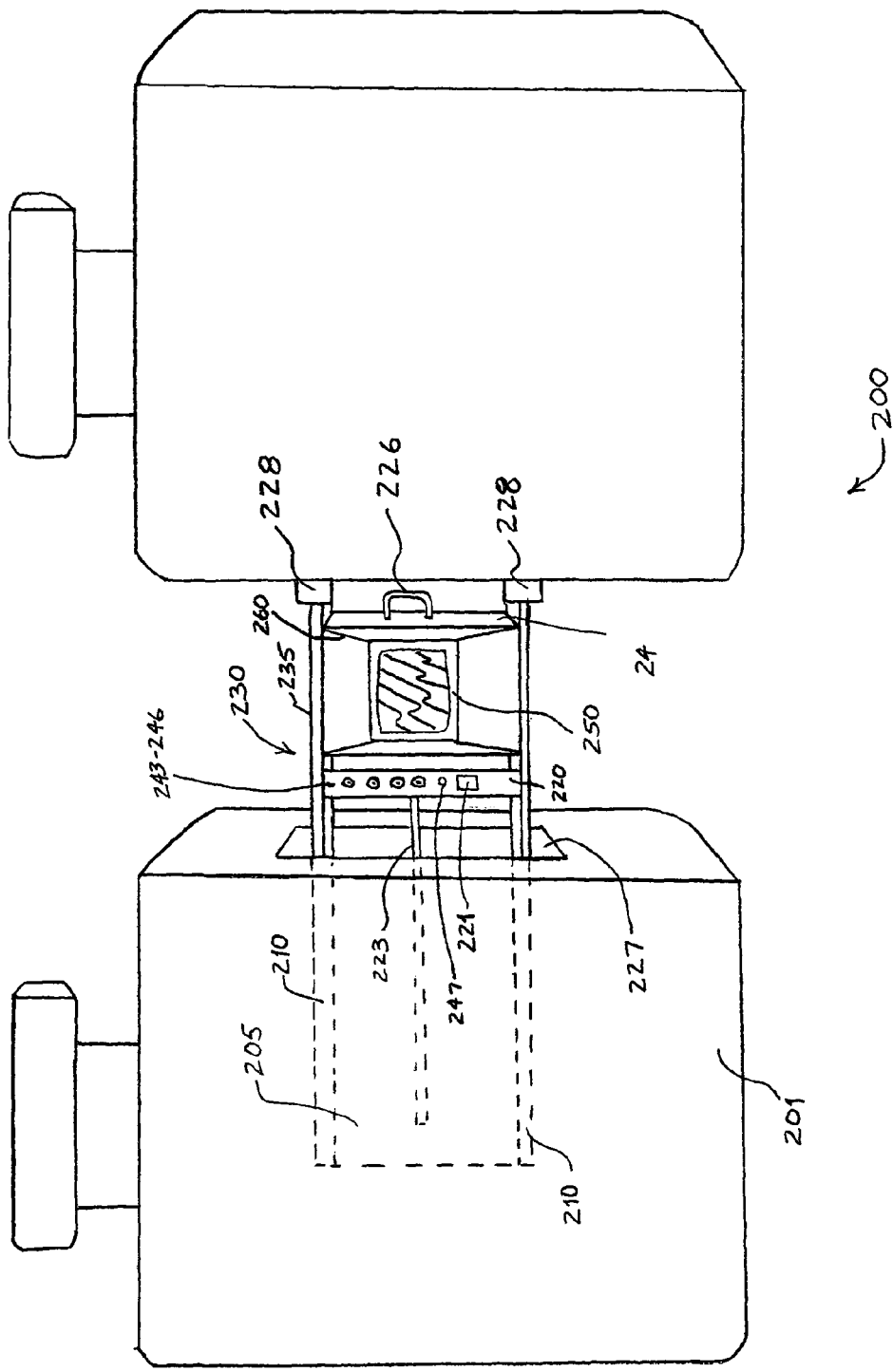
FIG. 3A is an illustration of a video system according to an embodiment of the present invention.
Figure 3B:
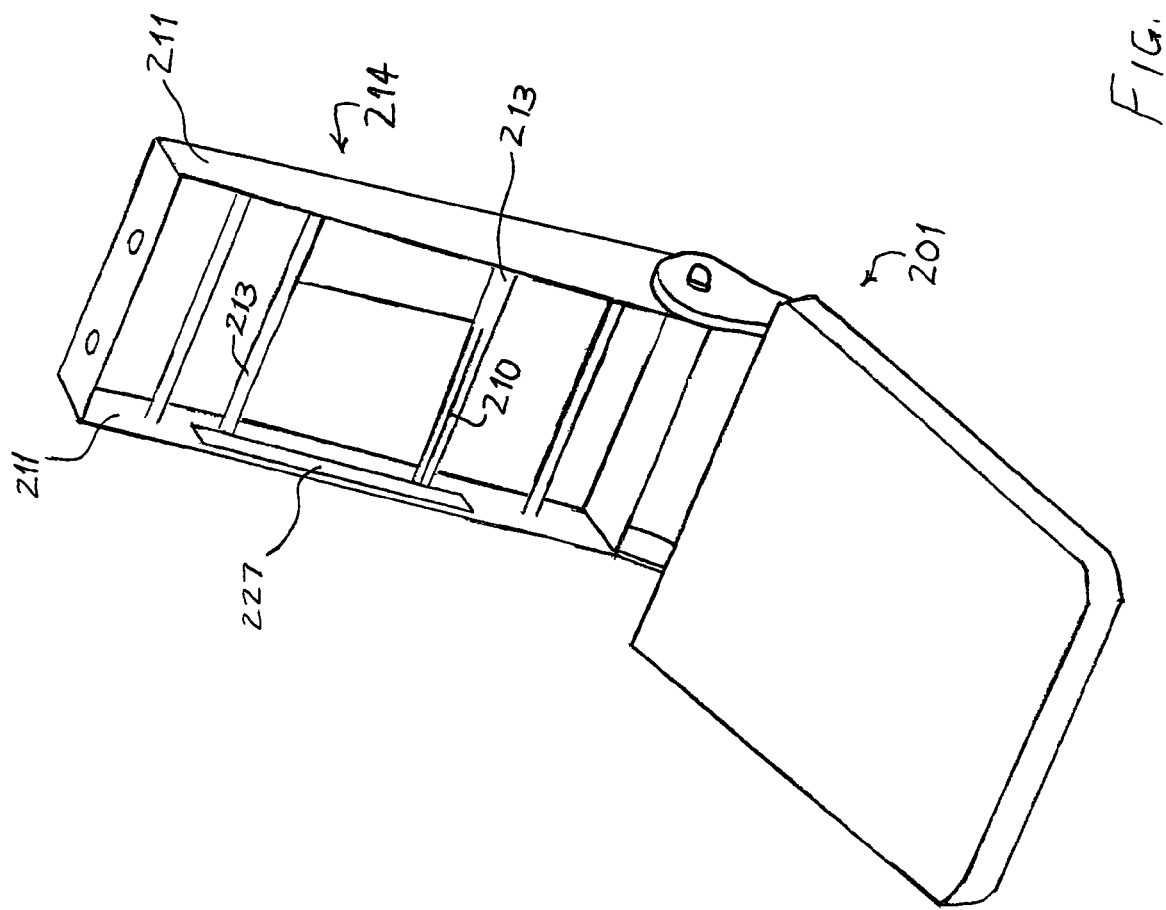
FIG. 3B is an illustration of a structure of a vehicle seat incorporating a video system according to an embodiment of the present invention.
Figure 4A:
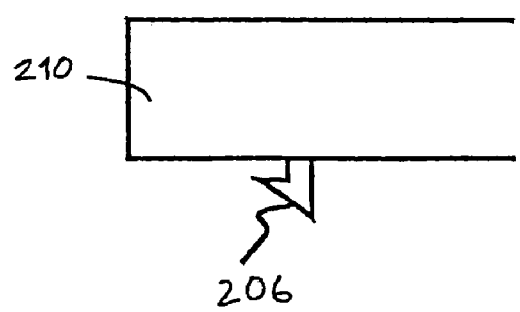
FIGS. 4A and 4B are illustrations of devices for fixing different structures in video systems according to embodiments of the present invention.
Figure 4B:
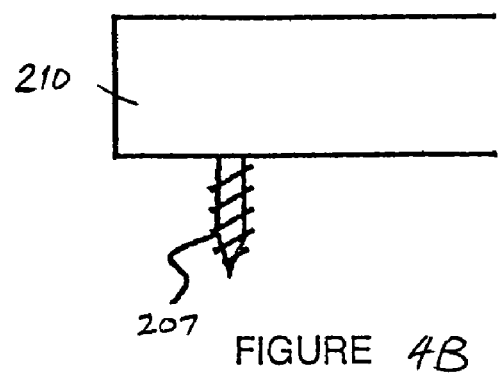

Referring to FIGS. 3A-3B, a video system 200 is mounted in the middle portion of a vehicle seat 201. The seat 201 includes a hollowed out area or cavity 205. The cavity 205 includes at least one track 210 positioned in the cavity 205. FIG. 3A shows that there are preferably two tracks 210 aligned in parallel and positioned at upper and lower portions of the cavity 205. The tracks 210 may be fixed to an internal structure 214 in the seat 201, such as vertical support members 211 and/or horizontal support members 213. As shown in FIGS. 4A-4B, the tracks 210 are fixed to structure 214 of the seat 201 by, for example, catches 206, screws 207, adhesives, epoxies and/or any other means known to those skilled in the art.

As shown in FIG. 3B, the tracks 210 are secured to horizontal support members 213, which are, in turn, secured to vertical support members 211 of the seat 201. The tracks 210 may also be positioned between and secured to the vertical support members 211 independent of the horizontal support members 213. Depending on the position of the tracks 210 and size of the seat 201, it may be necessary to tailor or alter the internal structure 214 of the seat 201 by, for example, removing or cutting out portions of the structure 214, to accommodate for an unobstructed path of the video system 200 in and out of the seat. The tracks 210 may be made from a rigid material, such as aluminum, plastic, rubber, or the like.

A slide mechanism 230 includes at least one, but preferably two rails 235 which engage the tracks 210. As shown in FIGS. 5A-5B, the tracks 210 include grooves 212 for receiving wheels and/or complimentary grooves positioned on the rails 235 so as to allow the rails 235 to slide in the horizontal direction along the tracks 210. Like the tracks 210, the rails 235 may be made from a rigid material, such as aluminum, plastic, rubber, or the like.

Figure 6:
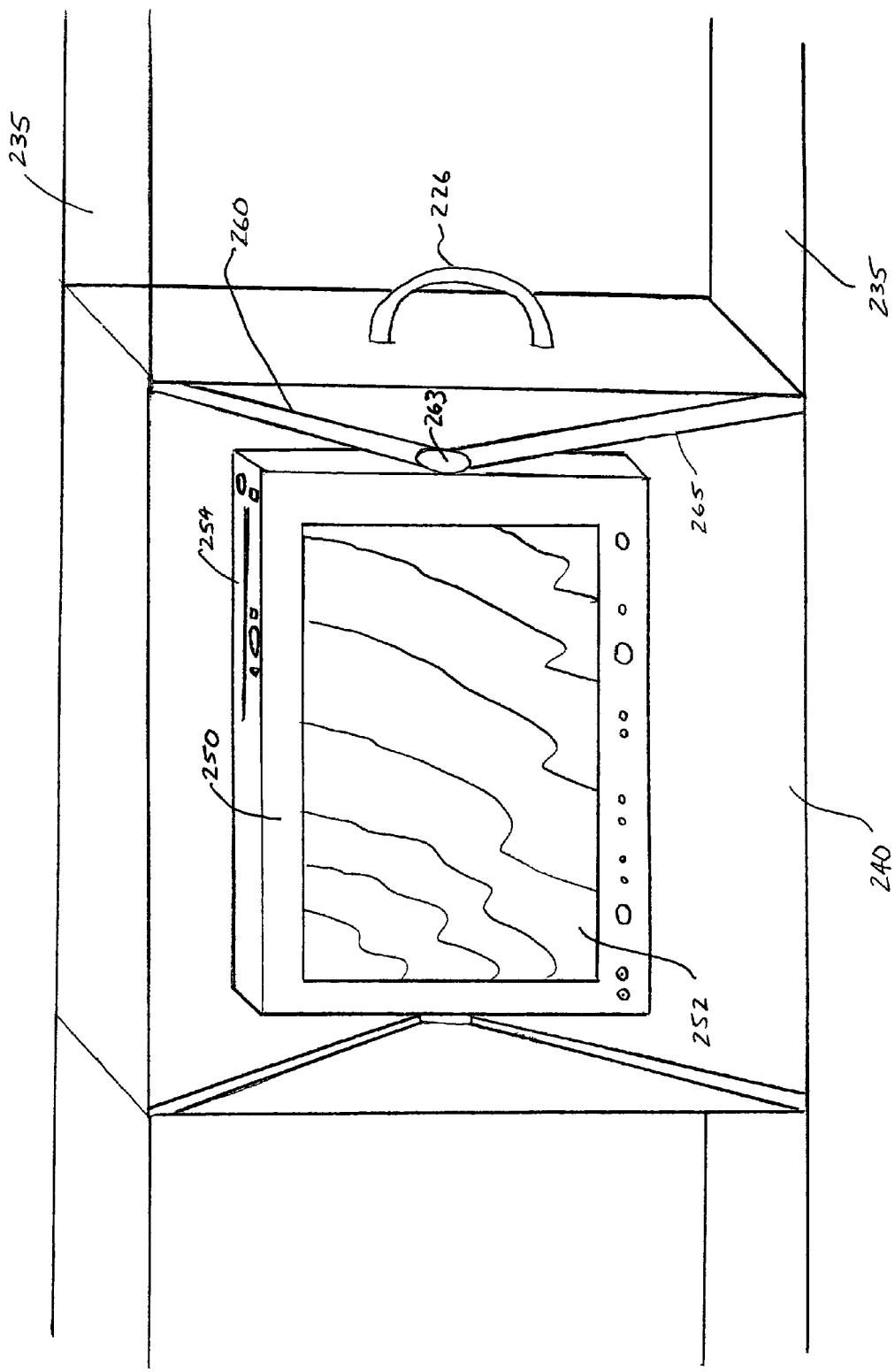
FIG. 6 is an illustration of a display and media player mounted to a housing according to an embodiment of the present invention.

Referring to FIG. 6, a housing 240 is attached to and positioned between the rails 235. The housing 240 may be permanently anchored to the rails 235 using, for example, catches 206, screws 207 or an adhesive. The housing 240 may also be capable of being attached to and detached from the rails 235 using, for example, clips, hooks, snaps, and locks.

As shown in FIG. 6, an entertainment unit 250, including a display 252 and a media player 254 is attached to the housing 240 using, for example, a gimbal mount 260. The gimbal mount 260 or a similar mounting device permits adjustment of the entertainment unit 250 to different positions or angles, along and about the x, y and z axes.

In this specification, the x-axis is defined as the axis running in the direction of the width of the vehicle, that is, from the driver and passenger sides of the vehicle. The y-axis is defined as the axis running in the direction of the height of the vehicle, that is, from the ground to the roof of the vehicle. The z-axis is defined as the axis running in the direction of the length of the vehicle, that is, from the front end to the rear end of the vehicle.

The gimbal mount 260 may be used to change a user's viewing angle of the display 252. More specifically, the wheels or knobs 263 of the mount 260 may be loosened to permit rotation of the entertainment unit 250 about the z-axis to a desired tilt angle and then tightened to fix the entertainment unit 250 in place.

The mount 260 also may be used to fix the entertainment unit 250 at different positions along the x-axis, y-axis and the z-axis. For example, a user can slide the arms 265 of the mount 260 into and out of a recess (not shown) in the housing 240, and lock the arms 265 in place at different lengths to allow for left/right (x-axis), up/down (y-axis) and forward/rearward (z-axis) adjustment of the entertainment unit 250.

Other means for attaching the entertainment unit 250 to the housing 240 may be employed, such as clips, hooks, straps, catches 206, screws 207 and the like. The entertainment unit 250 may be removed from the housing 240 for home use.

Figure 7:
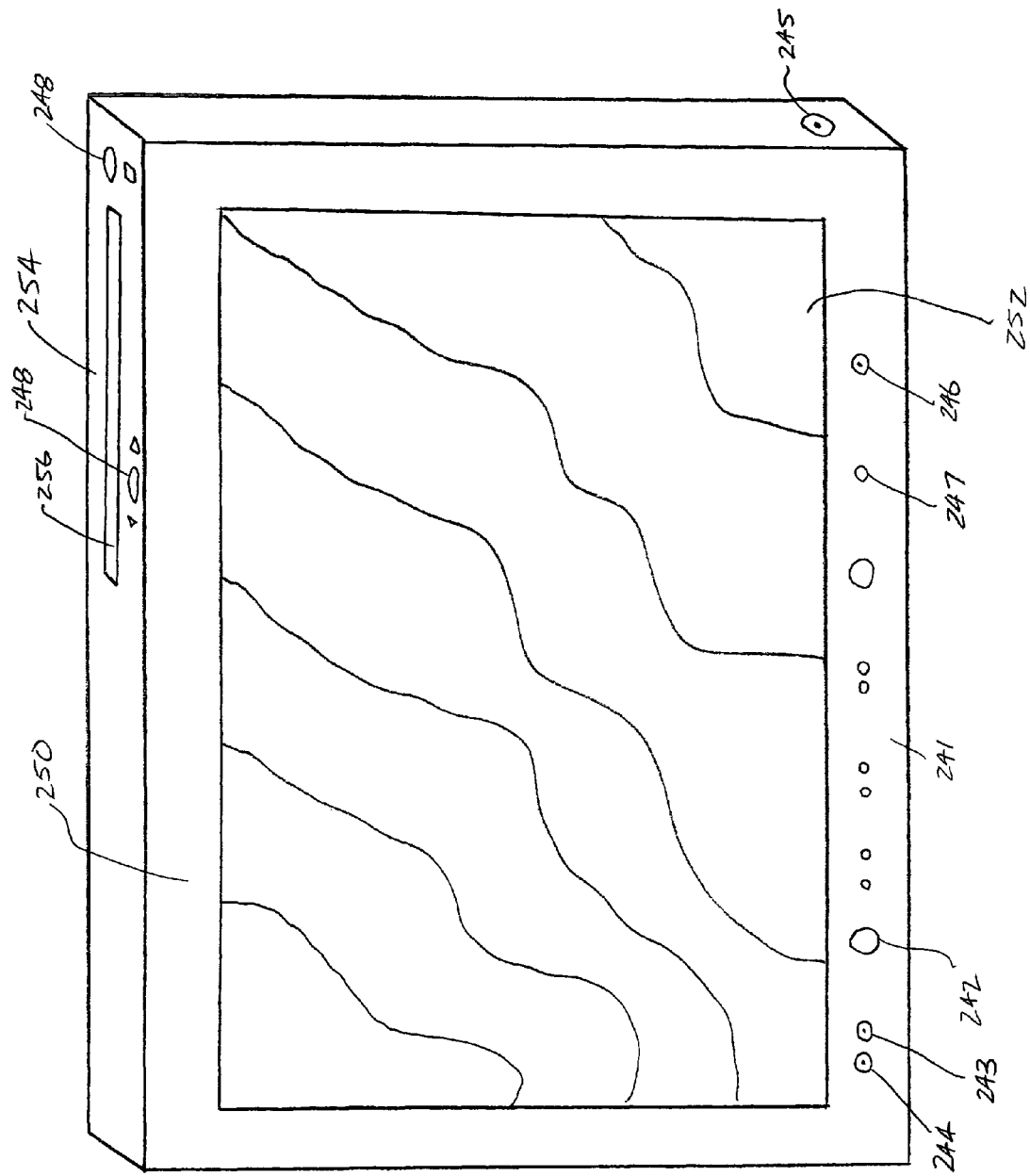
FIG. 7 is an illustration of a display and media player according to an embodiment of the present invention.

Referring to FIG. 7, the entertainment unit 250 preferably includes a thin liquid crystal display (LCD) 252 with a built-in digital video disk (DVD) media player 254 positioned behind the display 252 on top, bottom, left or right sides of the entertainment unit 250. The display 252 can be a full color TFT active matrix display. Other types of displays may be employed, such as gas plasma, and other media players may be employed such as a videocassette player, an MP3 player or other device capable of playing at least one of computerized video files and computerized audio files, a CD player, video game player, and a television or radio tuner. As shown in FIG. 7, the media player 254 is preferably a slot-type media player, including a slot 256 for receiving a data media to be played. However, the media player may also be a drawer-type device comprising a drawer and a spindle for securing a data media in place or a clamshell-type device having a cover which can be opened to allow insertion of a data media into the media player.

Figure 8:
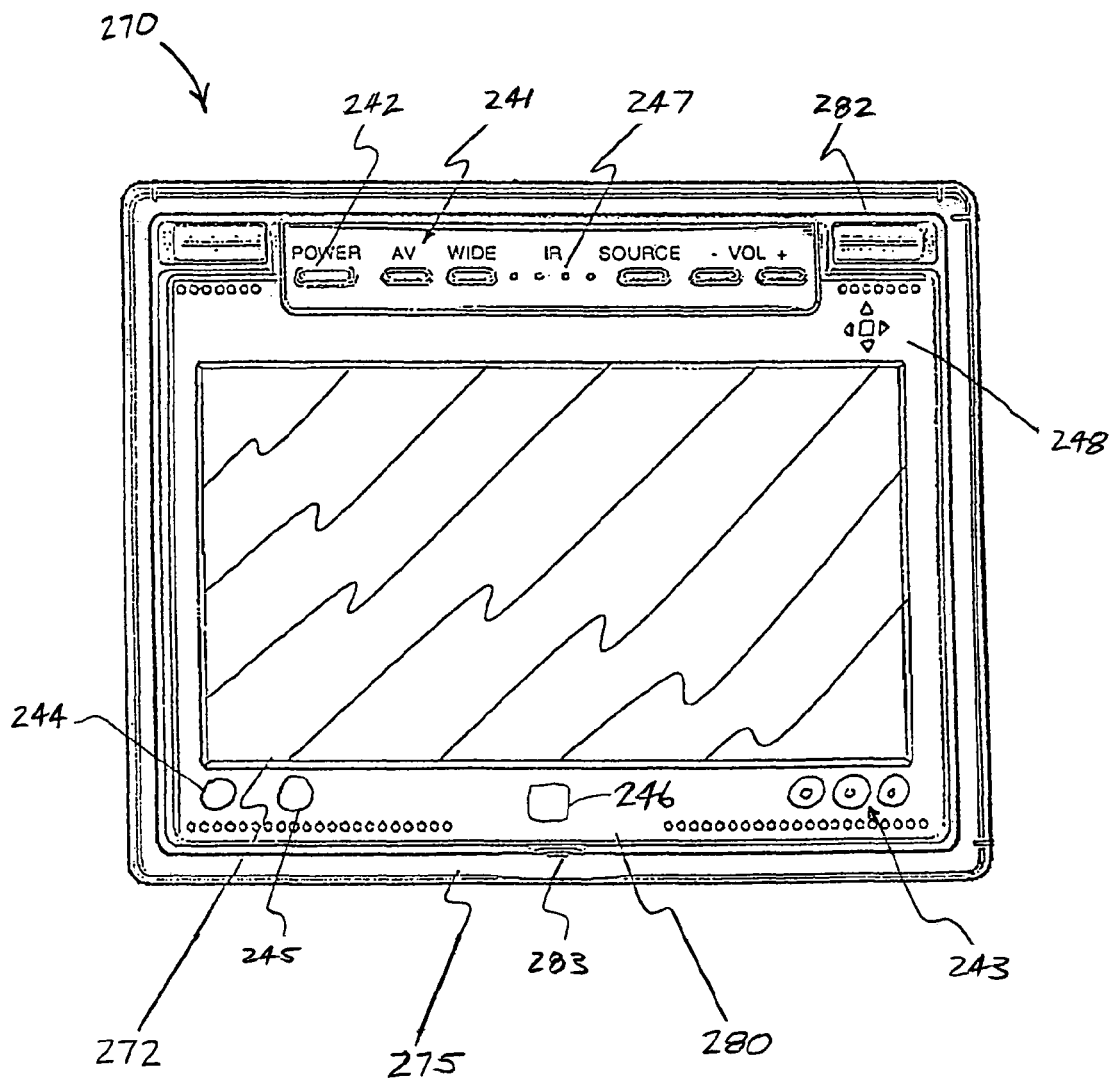
FIGS. 8A-8C are illustrations of a display and media player mounted to a housing according to an embodiment of the present invention.
Figure 8B:
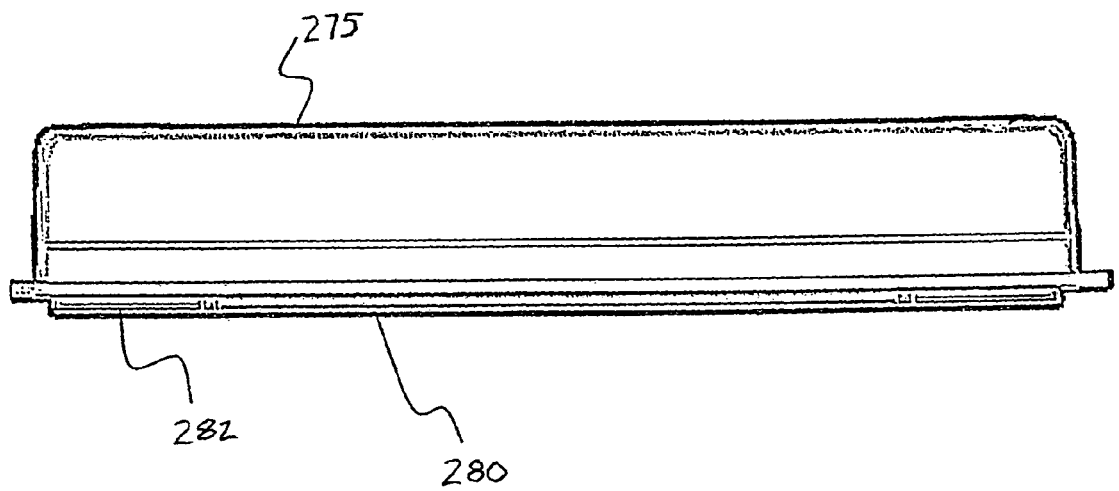
Figure 8C:
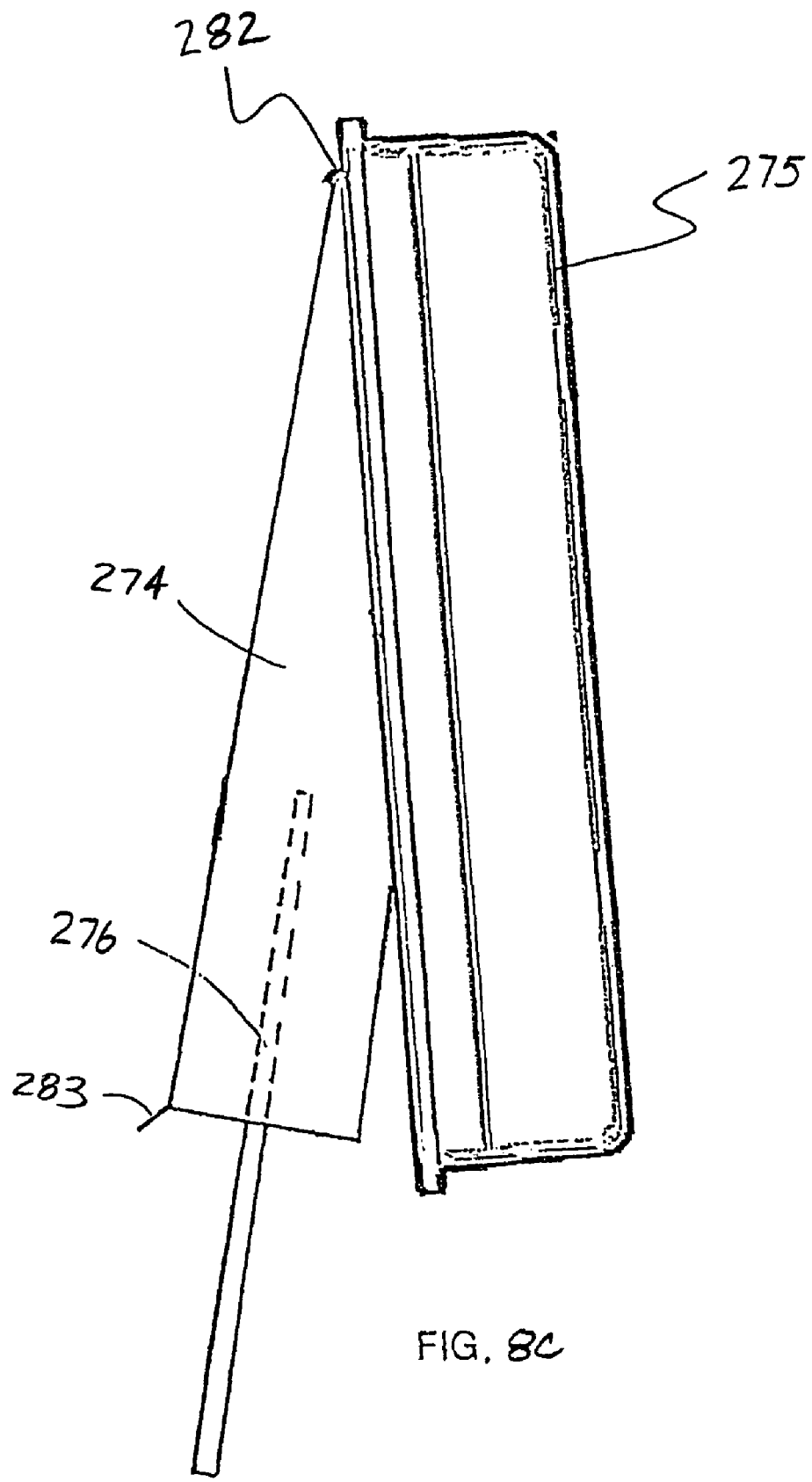

Referring to FIGS. 8A-8C, another entertainment unit 270 is attached to a housing 275 on a door 280 connected via a hinge or hinges 282 to the housing 275. The door 280 includes the media player 274 such as a DVD player, and a display 272 formed on opposite sides of the door 280. Alternatively, as shown in FIGS. 9A-9D, an entertainment unit 290 may include a display 292 mounted to the door 280 and a media player 294 positioned in the housing 295 behind the door 280. With the entertainment units 270 and 290, the housings 275 and 295 may attach directly to the slide mechanism in place of housing 240 or may attach to the housing 240 via, for example, the mount 260. In either case, the housings 275 and 295 can be selectively removable from the slide mechanism 230 or housing 240 to allow for home use of the entertainment units 270 and 290. Alternatively, the housings 275 and 295 may be permanently anchored to the slide mechanism 230 (e.g., directly to the rails 235 or to the housing 240).

The media players 274 and 294 may be slot-type (e.g., FIGS. 8A-8C), clamshell type (e.g., FIGS. 9A-9D) or a drawer-type device. The displays 272, 292 and the media player 274 can be fixed to the door 280 and the media player 294 can be fixed in the housing 240 by, for example, screws 207, catches 206, adhesives, molding, pressure fitting and/or any other means known to those skilled in the art. As an alternative to permanent attachment of the media player 294 to the housing 240, the media player 294 also may be capable of being selectively coupled and decoupled from the housing 240.

The hinge 282, located at a top portion of the door 280, allows the door 280 to pivot away from the housing 240 to expose a slot 276 in the slot-type media player 274 for receiving a data media or a cover 296 of the clamshell-type media player 294 to be opened to allow insertion of a data media, such as a DVD. The hinge 282 may be positioned at top, side or bottom portions of the door 280, and depending on the location of the hinge 282, the slot 276 may be positioned at top, side or bottom portions of the media player 274. The door 280 may be opened, for example, by pulling a tab 283 and/or by depressing a button (not shown) releasing the door 280 from the housing 240. The door 280 may be closed by re-engaging the released side of the door 280 with the housing 240. A desired program can be played for viewing while the door 280 is in the closed position.

A control panel 241 including control buttons 242 for controlling the on screen display characteristics may be positioned on the entertainment units 250, 270 and 290. Controls 248 for controlling functions, such as, volume, previous, next, pause, eject, play and power on/off, may be positioned on the housing 240, the door 280, displays 252, 272 and 292, and/or the media players 254, 274 and 294. The controls 248 can be, for example, buttons, switches, a touch sensitive liquid crystal display and the like.

Figure 9A:
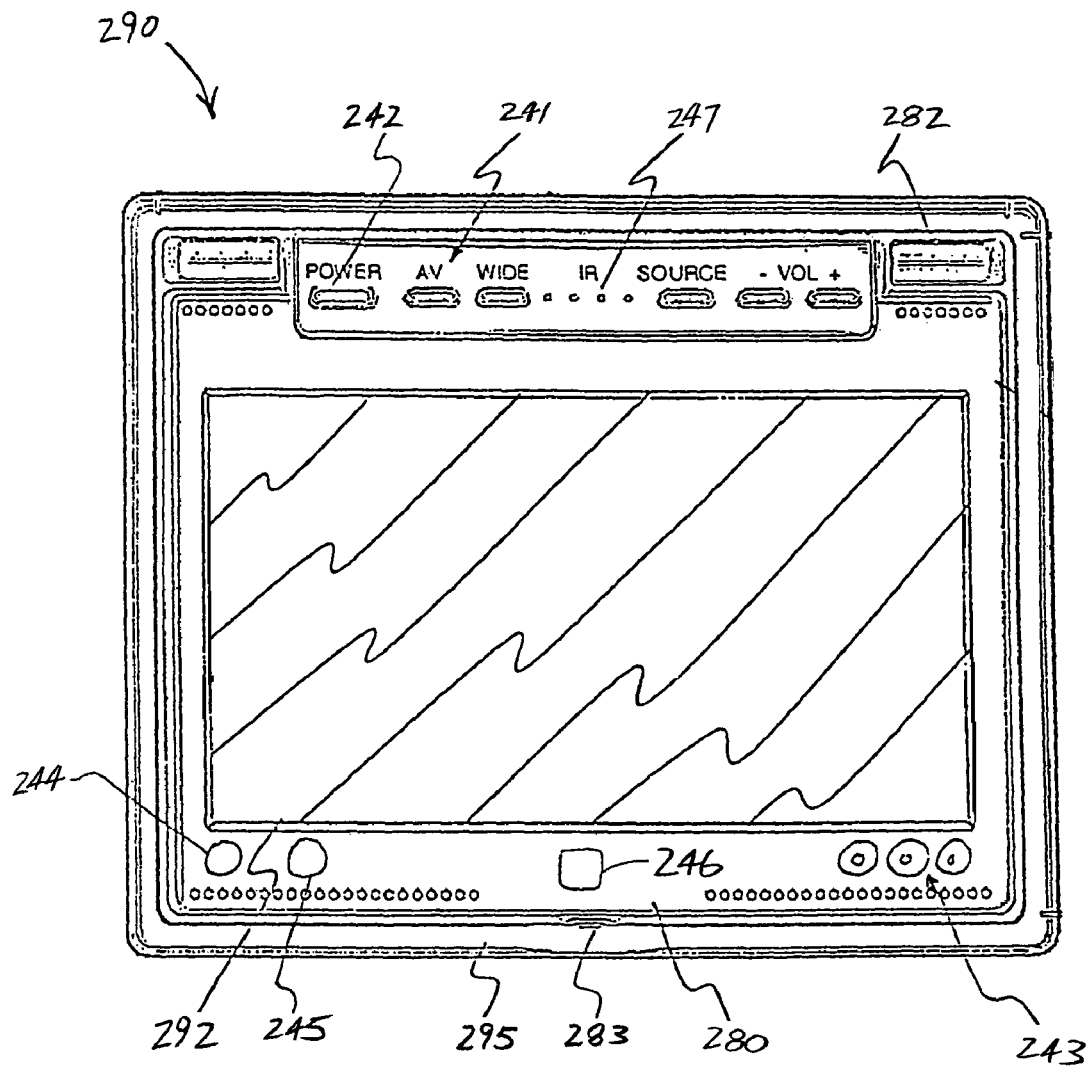
FIGS. 9A-9D are illustrations of a display and media player mounted to a housing according to an embodiment of the present invention.
Figure 9B:
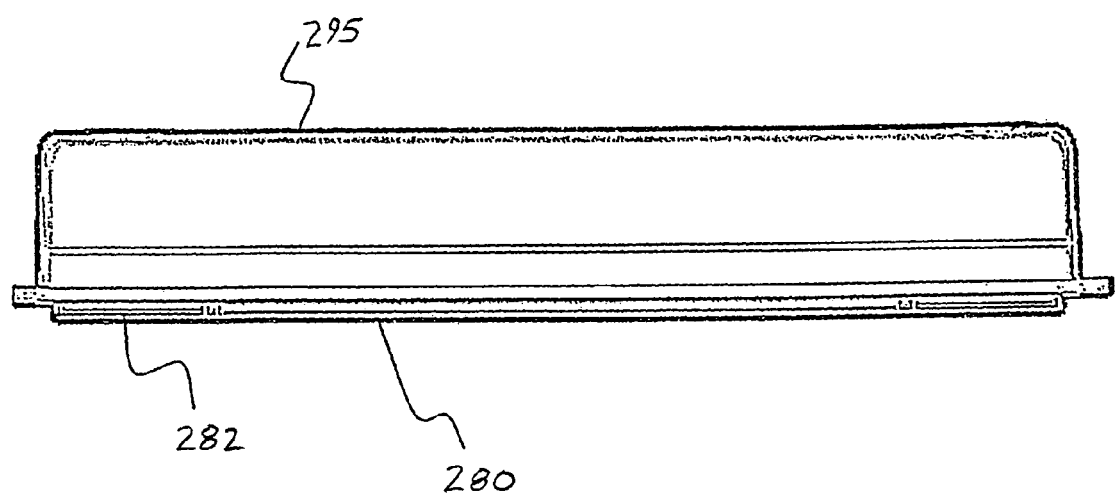
Figure 9C:
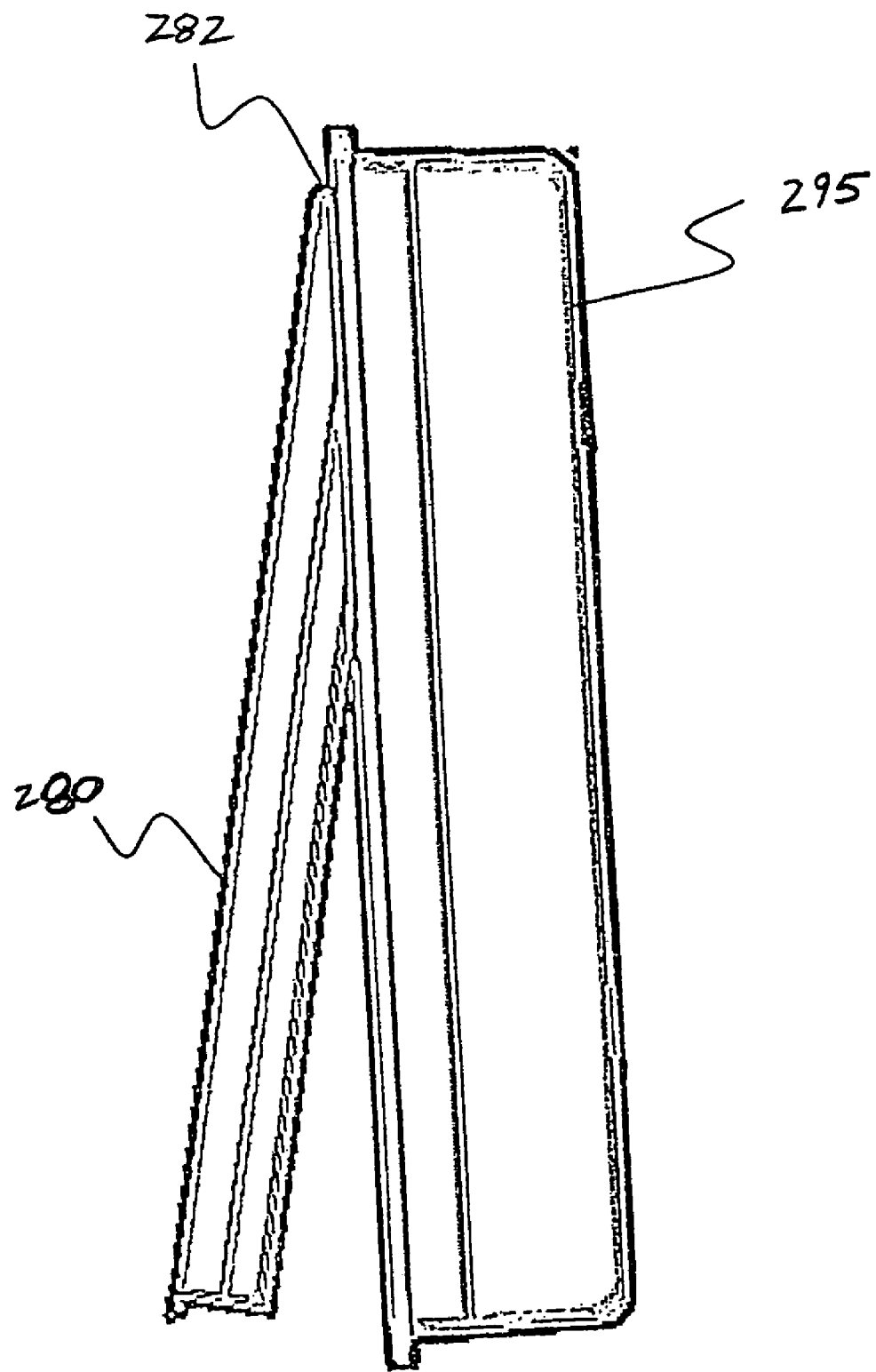
Figure 9D:
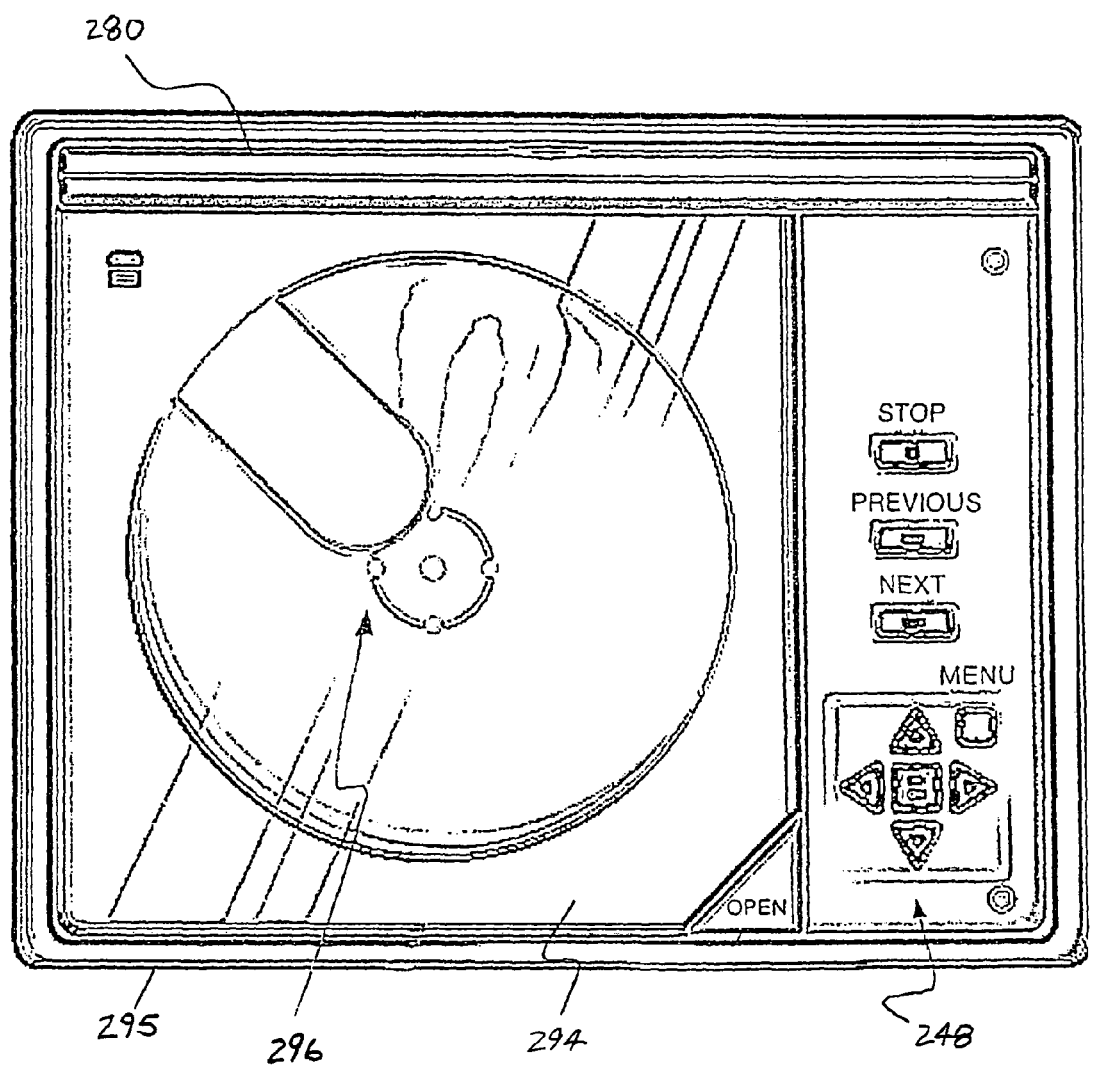

The entertainment units 250, 270 and 290 may include input and output ports. For example, as shown in FIGS. 7, 8A and 9A, audio/video input/output ports 243, a headphone port 244, a power port 245 and an IR port 246 for transmitting and/or receiving, for example, remote control signals. It should be understood that other port types can be provided, for example, a USB port or RCA jack for connecting to a game controller or headphones.

The ports 243-246 can also be positioned at any other convenient location on the video system 200. For example, as shown in FIG. 3, the ports may be positioned on an input station 220 mounted between the rails 235 of the slide mechanism 230. The input station 220 may include a power inverter 221 mounted thereto, wherein the power inverter 221 is connected to a vehicle's power supply through a power cable 223 running through the vehicle seat 201 or, alternatively to an external power cable. The entertainment units 250, 270 and 290 may be connected to the power inverter 221 or directly to the power cable 223 depending on the entertainment unit specifications.

A speaker (not shown) for presenting audio information in connection with a video program being played can be mounted on the housing 240, the door 280, or the displays 252, 272 and 292. Alternatively, audio may be provided to vehicle occupants through the existing vehicle audio system.

To provide for audio reception through wireless headphones, the video system 200 may include a wireless transmitter 247 for transmitting wireless signals to wireless receivers in wireless headphones. As shown in FIGS. 3, 7, 8A and 9A, the wireless transmitter 247 may, for example, be positioned on the entertainment units 250, 270 and 290 or on the input station 220. The wireless signals may include radio frequency signals for use with, for example, Bluetooth® wireless systems or infrared (IR) signals for use with, for example, Whitefire® systems. It is preferred that the wireless transmitter 247 have the capability to transmit wireless signals over more than one channel operating at a different frequency for each channel. The use of more than one channel, for example, avoids interference between more than one wireless headphone user watching different programs on different displays. Wireless signals also may be encoded to prevent interference between wireless headphones. Such encoding may be based on, for example, spread spectrum technology. The wireless transmitter 247 can include an optical transmitting device (e.g., an LED, a laser, and so forth) and an antenna for wireless transmission of IR signals and RF signals, respectively.

The video system 200 may be stored in the cavity 205 when not in use. When the video system 200 is ready to be used, a door (not shown) covering the slot 227 can be opened providing access to the video system 200. Referring back to FIG. 3, a handle 226 positioned on the housing 240 is grasped by a user so that the user can slide the slide mechanism 230 out from inside the cavity 205. The rails 235 are slid on the tracks 210 until they reach the seat on the opposite side. Each rail 235 is preferably equipped with a catch (not shown) at the end remaining in or near the cavity 205 so that each rail 235 does not become disengaged from the track 210 when pulled out from the cavity 205. The other end of each rail 235 meets with locking devices 228 positioned on the opposite side seat to lock the slide mechanism 230 in place, thereby securing the video system 200 between the two seats 201.

Figure 10C:
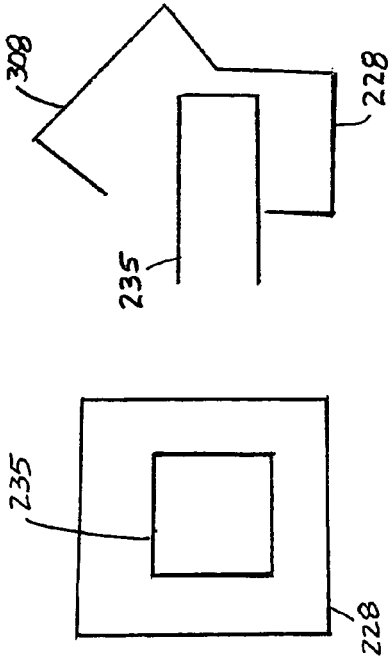
FIGS. 10A-10C are illustrations of locking devices used in connection with a video system according to an embodiment of the present invention.
Figure 10A:
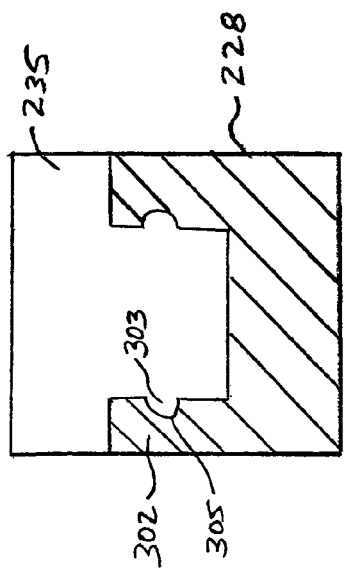
Figure 10B:
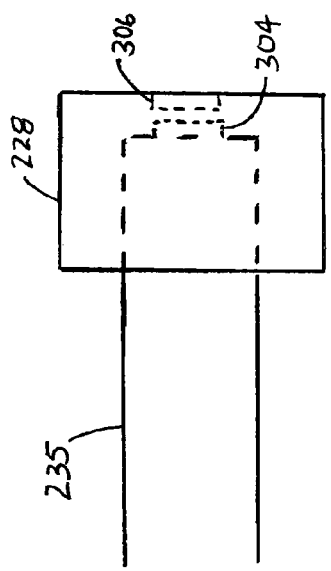

Referring to FIGS. 10A and 10B, each locking device 228 may include a quick release mechanism for securing and releasing each rail 235 of the slide mechanism 230. As shown in FIG. 10A, the quick release mechanism can include a snap-fit mechanism 302, wherein as a rail 235 is pressed into the locking device 228, the snap-fit mechanism 302 flexes away from the rail 235 and, once the rail 235 is in place, the snap-fit mechanism flexes back against or around the rail 235. Each rail 235 can be tapered at a bottom portion thereof and can include a tab 303 which fits into a recess 305 in the snap-fit mechanism 302, thereby securing the rail 235 in place. The snap-fit mechanism 302 can be formed of, for example, a flexible thermoplastic rubber or metal.

Alternatively, as shown in FIG. 10B, the end of each rail 235 can include a magnetic fastener 304 that mates with a magnetic fastener 306 in the locking device 228 to secure each rail 235 to the locking device 228. In another alternative, as shown in FIG. 10C, each locking device 228 may include a hinged piece 308 which is in an open position when the rail 235 is inserted into the locking device 228 and closed around the rail 235 to secure the rail 235 in place. Other means of securing the rails 235 to the locking devices 228 are contemplated, such as, snaps, locks, latches, and the like.

Figure 11A:
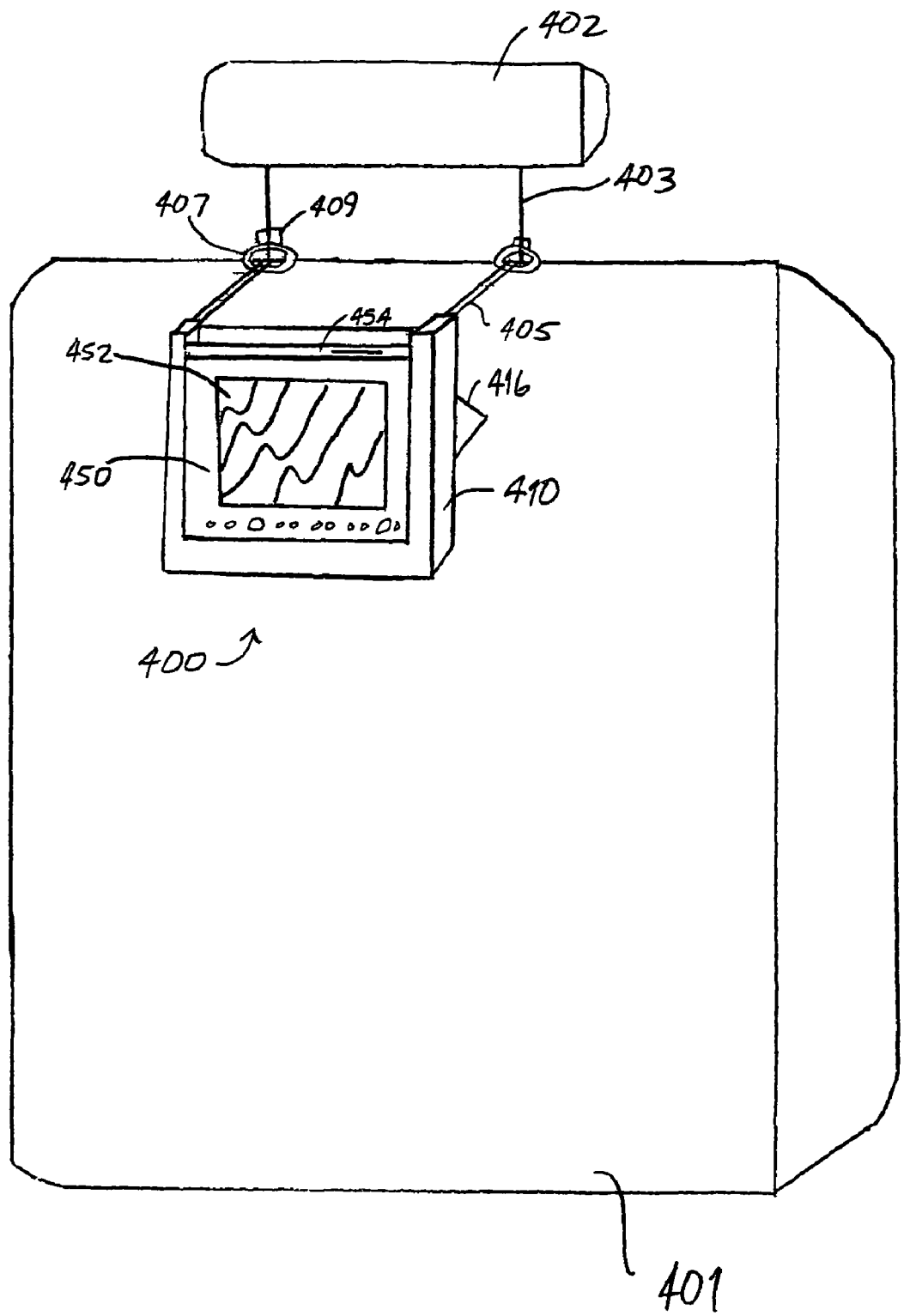
Figure 11B:
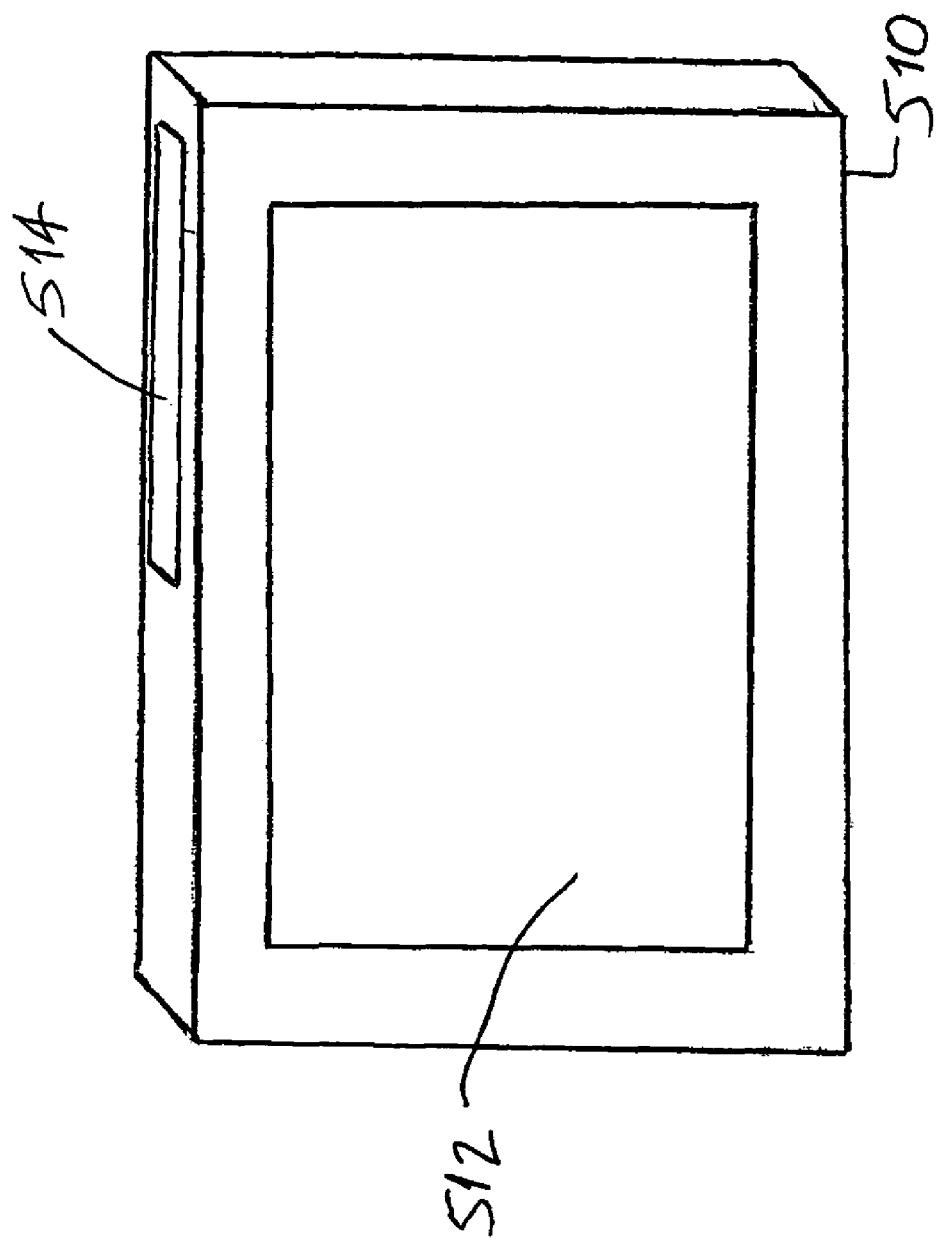

Referring to FIGS. 11A-11C, in another embodiment of the invention, a video system 400 is hung from the posts 403 of a vehicle seat headrest 402. Rigid members, such as mounting posts 405, include brackets 407 at one end thereof, which are secured to the headrest posts 403. The brackets 407 include rings or some other appropriate device capable of sliding onto the headrest posts 403 when the headrest 402 is removed from the seat 401. The rings may also open and close so that the headrest 402 does not have to be completely dislodged from the seat 401 for the rings to be placed around the headrest posts 403. The rings can be locked in place around the headrest posts 403 using a locking device 409. The locking device 409 may include, for example, a clasp, clip, a snap-fit mechanism, or a threaded member, such as a locking nut.

Figure 12A:
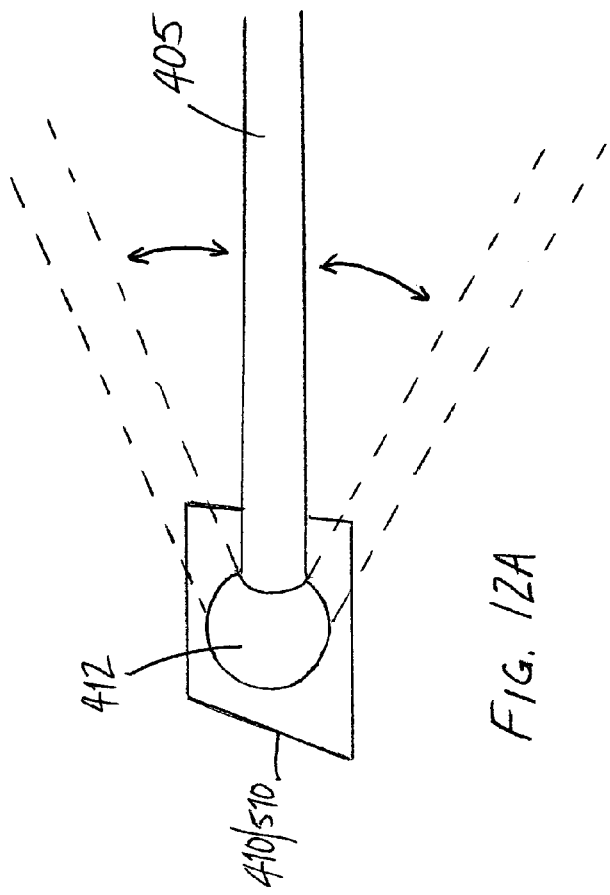
FIG. 12A is an illustration of a moveable joint for use with a video system according to an embodiment of the present invention.
Figure 12B:
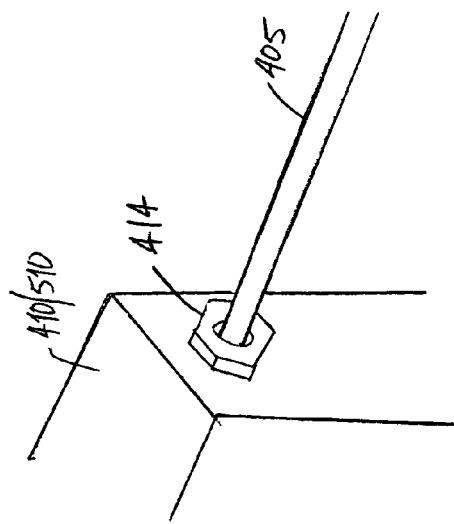
FIG. 12B is an illustration of a locking device for use with a video system according to an embodiment of the present invention.

The mounting posts 405 are connected to a housing 410 or, as shown in FIG. 11B, a housing 510. The housing 510 includes openings 512 and 514 for allowing a user to view the display 452 and to access the media player 454, respectively. The mounting posts 405 may be adjustable in left/right (x-axis), up/down (y-axis), and forward/rearward (z-axis) directions. The mounting posts 405 preferably are able to swivel, at least in the left and right directions, to allow for adjustment necessary to accommodate for different spacing of headrest posts 403. As shown in FIG. 12A, the mounting posts 405 may be connected to the housing 410/510 via a ball joint 412 or similar moveable joint that allows for multi-dimensional adjustment of the mounting post 405. The ball joint 412 may include a mechanism to lock the ball joint device 412 into place once it is moved to a desired position. As shown in FIG. 12B, the mounting posts may be locked into a desired position using a locking nut 414. The mounting posts 405 also may be telescopic to allow for forward/rearward (z-axis) adjustment of housing 410/510. The number of mounting posts 405 may vary (i.e., more or less than the two mounting posts 405 shown in FIG. 11A) depending on the support required for the video system 400.

Adjustment of the mounting posts 405 facilitates connection of the video system 400 to a vehicle seat 401 and allows for viewing angle adjustment and for fixing the video display 452 in different positions along the x, y and z axes. Also, as shown in FIGS. 11A and 11C, an adjustable wedge 416 may be positioned between the housing 410/510 and the vehicle seat 401 to allow for adjustment of the tilt angle of the display 452 about the z-axis. The adjustable wedge 416 can be mounted to the housing 410/510 and locked into different positions along the y-axis to alter the tilt angle of the display 452. Referring to FIG. 11C, a height h2 of the adjustable wedge 416 is substantially less than a height h1 of the housing 410/510. For example, the height h2 is less than about ½ the height h1 of the housing 410/510. One end of the adjustable wedge 416 may be fixed to the housing 410/510 or rest in respective recesses positioned at different points up and down a panel of the housing 410/510. The other end of the adjustable wedge 416 may butt against the vehicle seat. The adjustable wedge 416 is preferably made from a material with a high coefficient of friction that will not slide against the vehicle seat. The display 452 also can be capable of pivoting to different tilt angles, in which case an adjustable wedge 416 is not needed to change the tilt angle of the display 452.

An entertainment unit 450, including a display 452 and a media player 454 is attached to the housing 410/510 using, for example, screws 207, catches 206, adhesives, molding, pressure fitting and/or any other means known to those skilled in the art. Like the entertainment unit 250, the entertainment unit 450 may be temporarily connected to the housing 410/510 by, for example, clips, hooks, straps and the like, to allow for removal of the entertainment unit 450 from the housing 410/510 for home use. The housing 410/510 may be formed from unbendable material such as plastic, metal, wood, or the like. Alternatively, the housing 410/510 may be formed from a bendable material such as cloth, leather, canvas or the like. The housing 410/510 may, therefore, have a bag or bag-like structure into which the entertainment unit 450 can be inserted to snugly fit therein and easily removed. Also, the mounting posts 403 may be removably connected to the housing 410/510 to allow for use of a housing 410/510 coupled to an entertainment unit in the home environment.

Like the entertainment unit 250, the entertainment unit 450 preferably includes a thin liquid crystal display (LCD) 452 with a built-in digital video disk (DVD) media player 454 positioned behind the display 452 on top, bottom, left or right sides of the entertainment unit 450. Other types of displays and other types of media players may be employed. For example, entertainment units that are the same or similar to the entertainment units 250, 270, and 290, described above with reference to FIGS. 7-10, may be used with the video system 400. For example, the housing 410/510 may be used in place of or in combination with the housings 240, 275 or 295 to support the entertainment units 250, 270 or 290. Duplicate descriptions of the entertainment units have been omitted.

Like the entertainment units 250, 270 and 290, an entertainment unit used in accordance with the embodiment shown in FIGS. 11A-11C, (e.g., entertainment unit 450), can connect to a vehicle's power supply through a power cable running through the vehicle seat 401. The entertainment unit may also be connected to an external power cable and may be connected to a power inverter.

Further, like the above-described embodiments, speakers (not shown) for presenting audio information in connection with a video program being played can be mounted, for example, on the housing 410/510, the display 452, or a door, like the door 280, used in conjunction with specific entertainment units. Alternatively, audio may be provided to vehicle occupants through the existing vehicle audio system or through wireless headphones by using a wireless transmitter like the wireless transmitter 247 for transmitting wireless signals to wireless receivers in wireless headphones.

Having described embodiments for a seat mountable video system, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described embodiments of the invention with the details and particularity required by the patent laws, what is claimed and desired protected by Letters Patent is set forth in the appended claims.

What is claimed is:

1. A video system, comprising:
    an entertainment unit comprising:
        a display; and
        a media source operatively coupled to the display;
    a housing attached to at least one rigid member coupled to at least one headrest support member of a seat in a vehicle using a bracket, and suspended at a rear of the seat, wherein:
        the at least one rigid member is attached to the housing via a moveable ball joint moveable in at least two of x-axis, y-axis and z-axis directions, wherein the at least one rigid member is locked into a desired position using a locking nut,
        the bracket includes a ring,
        the ring opens and closes to allow placement of the ring around the headrest support member without removing a headrest from the seat, and includes a snap-fit locking mechanism,
        the at least one rigid member telescopes to increase and reduce a length thereof along the z-axis direction,
        the housing includes a cavity to temporarily receive the entertainment unit in the housing and suspend the entertainment unit from the seat,
        the housing is formed in substantially a U-shape having an open side through which the entertainment unit is inserted and removed,
        the entertainment unit rests on a bottom side of the U-shape and is enclosed on left and right sides by left and right sides of the U-shape, and
    a wedge is positioned between the seat and the housing, one end of the wedge being positioned on a rear panel of the housing and another end of the wedge being butted directly against the seat, the wedge using friction between the wedge and the seat to prevent the wedge from sliding, and wherein a height of the wedge is less than a height of the housing.

2. A video system, comprising:
    an entertainment unit comprising:
        a display; and
        a media source operatively coupled to the display;
    a housing attached to at least one rigid member coupled to at least one headrest support member of a seat in a vehicle using a bracket, and suspended at a rear of the seat, wherein the housing includes a cavity to temporarily receive the entertainment unit in the housing and suspend the entertainment unit from the seat, wherein the bracket includes a ring, wherein the ring opens and closes to allow placement of the ring around the headrest support member without removing a headrest from the seat, and includes a snap-fit locking mechanism; and
    a wedge positioned between the seat and the housing, wherein the at least one rigid member is attached to the housing via a moveable ball joint moveable in at least two of x-axis, y-axis and z-axis directions, wherein the at least one rigid member is locked into a desired position using a locking nut, wherein the at least one rigid member telescopes to increase and reduce a length thereof along the z-axis direction, wherein one end of the wedge is positioned on a rear panel of the housing and another end of the wedge is butted directly against the seat, the wedge using friction between the wedge and the seat to prevent the wedge from sliding, and wherein a height of the wedge is less than a height of the housing.

3. The video system of claim 2, wherein the at least one rigid member is capable of being fixed in a plurality of positions along at least one of the x-axis, the y-axis and the z-axis.

4. The video system of claim 2, wherein the housing is formed from one of an unbendable material and a bendable material.

5. The video system of claim 2, wherein the housing includes at least one opening for providing access to the media source.

6. The video system of claim 2, wherein the housing includes at least one opening for allowing a view of the display.

7. The video system of claim 2, wherein the housing is formed in substantially a U-shape having an open side through which the entertainment unit is inserted and removed.

8. The video system of claim 2, further comprising at least one of an audio/video port, a headphone port, a power port, an infrared port and a wireless transmitter for transmitting wireless signals positioned on at least one of the display, the media source and the housing.

9. The video system of claim 2, wherein the media source is one of a slot-type device, a clamshell-type device and a drawer-type device.

10. The video system of claim 2, wherein the media source includes at least one of a DVD player, a CD player, a video game player, a videocassette player, a television tuner, a radio tuner, and a device capable of playing at least one of computerized video files and computerized audio files.

11. A video system comprising:
    an entertainment unit comprising:
        a display; and
        a media source operatively coupled to the display;
    a housing suspended at a rear of a vehicle seat, wherein:
        the housing includes a cavity to receive the entertainment unit in the housing and suspend the entertainment unit from the seat,
        the housing being fixed to different positions using a mounting mechanism, the mounting mechanism includes at least one mounting post positioned between the seat and the housing, one end of the at least one mounting post is attached to the housing and another end of the at least one mounting post is attached to a headrest post of the vehicle seat using a bracket, the bracket includes a ring, the ring opens and closes to allow placement of the ring around the headrest post without removing a headrest from the seat, and includes a snap-fit locking mechanism, and the one end of the at least one mounting post is attached to the housing via a moveable ball joint moveable in at least two of x-axis, y-axis and z-axis directions, wherein the at least one mounting post is locked into a desired position using a locking nut, wherein the at least one mounting post telescopes to increase and reduce a length thereof along the z-axis direction, wherein the mounting mechanism further includes a wedge positioned between the vehicle seat and the housing, wherein one end of the wedge is positioned on a rear panel of the housing and another end of the wedge is butted directly against the vehicle seat, the wedge using friction between the wedge and the seat to prevent the wedge from sliding, and wherein a height of the wedge is less than a height of the housing.

12. The video system of claim 11, wherein the at least one mounting post is capable of being fixed in a plurality of positions along at least one of the x-axis, the y-axis and the z-axis.

* * * * *